(12) United States Patent
Haas et al.

(10) Patent No.: US 6,761,953 B2
(45) Date of Patent: Jul. 13, 2004

(54) LAMINATED PARTS MADE OF OUTER LAYERS AND POLYURETHANE SANDWICH MATERIALS AND THEIR PRODUCTION

(75) Inventors: Peter Haas, Haan (DE); Reiner Paul, Leichlingen (DE); Walter Guarnieri, Sand in Taufers (IT); Adolf Lammeck, Lohmar (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/315,452

(22) Filed: Dec. 10, 2002

(65) Prior Publication Data

US 2003/0134085 A1 Jul. 17, 2003

(30) Foreign Application Priority Data

Dec. 17, 2001 (DE) .......................................... 101 61 980
Jul. 1, 2002 (DE) .......................................... 102 29 473

(51) Int. Cl.$^7$ ................................................ B32B 3/12
(52) U.S. Cl. ........................... 428/73; 428/71; 428/116; 428/593; 428/365; 264/45.1; 264/45.8; 264/51; 264/171.1; 264/240; 264/241; 264/257; 264/299
(58) Field of Search ......................... 428/116–118, 68, 428/71, 73, 593, 364, 365; 264/41, 45.1, 45.8, 51, 165, 171.1, 239, 240, 241, 257, 299

(56) References Cited

U.S. PATENT DOCUMENTS

| 3,843,486 | A | | 10/1974 | Johansson et al. ........... 156/276 |
| 6,331,028 | B1 | * | 12/2001 | O'Neill et al. ......... 296/100.01 |
| 6,537,413 | B1 | * | 3/2003 | Hochet et al. ............... 156/297 |
| 2002/0021027 | A1 | | 2/2002 | Kralik et al. ............... 296/210 |

FOREIGN PATENT DOCUMENTS

| CA | 2249954 | 4/1999 |
| GB | 1135315 | 12/1968 |

OTHER PUBLICATIONS

Bayer AG Order No. PU 52231e, edited 9/97, Presented by W. Klusmeier, H. Kühne, S. Bail, Johnson Controls, R. Paul, H.–A. Freitag, D. Frank, Bayer AG, Germany, Structhan A Composite with a Future.
Bayer AG Order No. PU 52248, (date unavailable) Dr. Reiner Paul, "PUR—Faserverbundwerkstoffe Für den Leichtbau im Fahrzeuginnenraum".
Mannesmann Magazin, Mar. 1998, "Neues LFI–PUR®–Verfahren bringt Schaumstoffe in Form".

* cited by examiner

Primary Examiner—Deborah Jones
Assistant Examiner—Wendy Boss
(74) Attorney, Agent, or Firm—Joseph C. Gil; N. Denise Brown

(57) ABSTRACT

The invention relates to laminated parts comprising outer layers and polyurethane sandwich materials, and to a method of producing these laminated parts and to their use in the automotive industry.

15 Claims, No Drawings

LAMINATED PARTS MADE OF OUTER LAYERS AND POLYURETHANE SANDWICH MATERIALS AND THEIR PRODUCTION

BACKGROUND OF THE INVENTION

The present invention relates to laminated parts comprising outer layers and polyurethane sandwich materials, to a method of making them and to their use in the production of parts for the automotive industry.

Parts in the external automotive industry with Class A surfaces and a special mechanical function are usually made of metal. The disadvantage of the use of metal is the heavy weight of the parts. The main surface quality criterion for Class A surface parts is the known wave scan process with low values for short and long wavelengths of the surface.

Where polyurethane moldings are employed, more compact materials with reinforcing substances are generally used, in order to improve specific mechanical properties such as, for example, flexural strength. Such reinforced polyurethanes are already in use as aprons, sills, beads or door coverings and wings in the external automotive industry. Relatively marked expansion behavior is characteristic of the materials used, that is to say, high linear thermal coefficients of expansion ($\alpha$ values) which are very different from those of the metals normally employed, and higher density. The main target of these articles are surface qualities with low short and long wavelength values determined by the known wave scan process.

In order to obtain excellent surface qualities in that case, with low long and short wavelength values, the articles may possibly have to undergo surface post-treatment.

In order to avoid all the above drawbacks, laminated PUR (polyurethane) parts with integral Class A outer layers have now been developed. These laminated PUR parts exhibit very high flexural strength level, low expansion behavior ($\alpha$ value within the range from 1 to $15 \times 10^{-6}$ m·K$^{-1}$·m$^{-1}$), low density and high surface quality. Similar laminated parts are already described in the status report titled "Structhan®, a composite fibrous material with a future" by Bayer AG, order No. PU 52231, and the reprint "Composite fibrous PUR materials for light-weight construction in vehicle interiors" by Bayer AG, order No. PU 52248.

These PUR-bonded composites have been found to have greater flexural strength at lower density than the outer layers used.

SUMMARY OF THE INVENTION

The invention relates to a laminated part comprising
A) a core,
B) fiber layers arranged on both sides of the core and impregnated with a polyurethane resin (P),
C) an outer layer of Class A surface quality on one of the fiber layers, and, optionally,
D) a decorative layer on the second fiber layer.

The invention also relates to a single-stage process for producing a laminated part with an outer, possibly decorative layer for the laminated parts in accordance with the present invention. Processing methods which may be used for producing the articles with the above-mentioned reinforcing substances are the NafpurTec process, LFI-/FipurTec or Interwet processes and laminating processes. The composite material is produced at molding temperatures of 60–140° C.

More specifically, the method of the invention for making laminated parts as described above comprises (I) applying a fiber layer B) which is impregnated with the constituents of the polyurethane resin (P) to both sides of a core A), (II) positioning an outer layer C), and, optionally, a decorative layer D) on the inside surface(s) of an open mold, (III) placing the composite formed in (I) into the open mold containing the outer layer C) and, optionally, the decorative layer D), (IV) closing the mold, and (V) bonding the outer layer, and the decorative layer when present, to the composite by the complete reaction of the constituents of the polyurethane resin (P) component.

The polyurethane resin (P) suitable for impregnating the fiber layers of the laminated parts in accordance with the present invention can be obtained by reacting:

(1) at least one polyisocyanate;
(2) at least one polyol constituent with an average OH number from 300 to 700, containing at least one short-chain and one long-chain polyol, the initial polyols having a functionality of 2–6;
(3) water;
(4) activators;
(5) stabilizers; and, optionally,
(6) other auxiliary materials, mold release agents and additives.

Suitable polyol constituents are polyols with at least two hydrogen atoms which are reactive with isocyanate groups. Polyester polyols and polyether polyols are preferably used.

According to the present invention, polymeric isocyanates of the diphenylmethane disocyanate series (pMDI types), prepolymers thereof, or crude MDI are preferably used.

Water is employed in quantities of 0.1–3.0, preferably 0.3–2.0, parts per 100 parts of the polyol formulation.

Normal activators for the expansion and crosslinking reaction such as, for example, amines or metal salts are used for catalysis.

Suitable foam stabilizers are chiefly polyether siloxanes, particularly water-soluble ones. These compounds generally have a copolymer of ethylene oxide and propylene oxide combined with a polydimethylsiloxane radical. Foam stabilizers of this type are described in, for example, U.S. Pat. Nos. 2,834,748, 2,917,480 and 3,629,308, the disclosures of which are herein incorporated by reference. Polysiloxane-polyoxyalkylene copolymers branched by allophanate groups according to DE-OS 25 58 523, believed to correspond to U.S. Pat. Nos. 4,096,162 and 4,163,830, the disclosures of which are herein incorporated by reference, are often of particular interest.

Other organopolysiloxanes, oxyethylated alkyl phenols, oxyethylated fatty alcohols, paraffin oils, esters of castor oil or ricinoleic acid, Turkey red oil and groundnut oil and cell regulators such as paraffins, fatty alcohols and dimethylpolysiloxanes are also suitable. Oligomeric polyacrylates with polyoxyalkylene and fluoroalkane radicals as side groups are further suitable for improving and/or stabilising the emulsifying action, dispersal of the filler, and the cellular structure. Surfactants are normally employed in quantities of 0.01 to 5 parts by weight per 100 parts by weight of polyol.

Other auxiliary materials, mold release agents and additives may optionally be incorporated in the reaction mixture for preparing the polyurethane resins. The include, for example, surface-active additives such as emulsifiers, flame retardants, nucleating agents, oxidation retardants, lubricants and mould release agents, dyes, dispersing aids and pigments.

The constituents are reacted in quantities such that the equivalence ratio of NCO groups in the polyisocyanate component (1) to the sum of the hydrogens in constituents (2) and (3), and possibly (5), which are reactive with isocyanate groups, is from 0.8:1 to 1.4:1, preferably from 0.9:1 to 1.3:1.

Thermoformable PUR foams, or paper, metal or plastic honeycombs may be used as the material for the core A) of the laminated parts according to the invention.

Fiberglass mats, chopped fiberglass strand mats, random layers of fiberglass, fiberglass fabric, cut or ground glass or mineral fibers, natural fiber mats and knitted fabrics, cut natural fibers and fiber mats, non-wovens and knitted fabrics based on polymer, carbon or aramid fibers and mixtures thereof may be employed as fiber material B). These fiber layers are arranged on or applied to both sides of the core, and impregnated with polyurethane resin. Suitable polyurethane resins are as described above.

Some suitable outer layers C) for the present invention include, for example, metal foils or sheets, and compact thermoplastic composites made of, for example, PMMA (polymethyl methacrylate), ASA (acrylic ester modified styrene acrylonitrile terpolymer), PC (polycarbonate), PA (polyamide), PBT (polybutylene terephthalate) and/or PPO (polyphenylene oxide) for external applications. The outer layer may be painted, made paintable or colored.

Textile materials with a barrier of TPU (thermoplastic polyurethane) sheeting to prevent foam from passing through, compact or foamed plastic sheets and spray-on or RIM polyurethane skins may be used as the decorative layer D).

The fiber component of fiber layer B) may be placed on the core A) as a fabric or, in the case of cut or ground fibers, introduced or sprayed on with the polyurethane component or over the polyurethane component (P).

The process for the production of the laminated parts according to the invention initially comprises applying a fiber layer B) to both sides of the core A), and applying the initial polyurethane constituents to the layer B). In an alternate embodiment, the reinforcing substance (i.e. fiber components) may be introduced onto the core A) through the flow of raw polyurethane materials, using a suitable mixer head technique. The polyurethane resins may be produced by processes described in the literature, e.g. the one-shot or prepolymer process, by means of processing apparatus basically known to persons skilled in the art. They are preferably produced by the one-shot process.

The blank (i.e. the laminated core) thus produced is transferred to a mold containing the outer layer C), and optionally a decorative layer D). This blank is bonded or joined to the outer layer C) and to the decorative layer D) (when present) by the closing of the mold, and reacting the raw PUR material components. The blank may equally be produced in the actual mold by suitable methods.

The laminated materials according to the invention are characterized by low densities within the range from about 400 to 700 kg/m$^3$, high flexural strength within the range from about 0.5 to 5.2×10$^7$ N·mm$^2$ and excellent surface quality (i.e. a Class A surface on one side). In particular, when the laminated materials of the present invention are compared with traditional plastics and metals used in the external application range such as PC/ABS (polycarbonate/acrylonitrile butadiene styrene), polypropylene, Noryl® (blend of polyphenylene oxide and polyamide; trademark from GE), SMC (sheet molding compounds) or aluminium or steel sheet, they have a considerably lower GSM (gram per square meter) with comparable flexural strength.

Some suitable applications of the laminated materials according to the invention within the automotive industry include, for example, roof, bonnet, rear wing, door or bottom plate modules.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following starting materials were used in the working examples.

Polyol 1: a trimethylolpropane initiated propylene oxide polyether polyol having an OH number of about 865 and a functionality of about 3

Polyol 2: a trimethylolpropane initiated propylene oxide polyether polyol having an OH number of about 1000 and a functionality of about 3

Polyol 3: a propylene glycol started propylene oxide/ethylene oxide (86%:14% by wt. PO:EO) polyether polyol having an OH number of about 42 and a functionality of about 2

Polyisocyanate: a polymethlyene poly(phenyl isocyanate) having an isocyanate content of 31.5% by weight (commercially available as Desmodur® 44V20L from Bayer AG)

Stabilizer: a silicon stabilizer commerially available as Polyurax® SR242 from Osi Crompton Witco Specialities, D 60318 Frankfurt, Humboldtstr. 12

Catalyst: an amino catalyst commercially available as Thancat® AN10, Air Products GmbH, D-45527 Hattingen Dye: Baydur® black paste DN, Bayer AG

| Polyurethane formulation 1: | |
|---|---|
| Polyol 1 | 30 pts/wt |
| Polyol 2 | 20 pts/wt |
| Polyol 3 | 33 pts/wt |
| Catalyst | 2.8 pts/wt |
| Stabiliser | 1.3 pts/wt |
| Acetic acid | 0.3 pt/wt |
| Water | 1.4 pts/wt |
| Dye | 3.3 pts/wt |
| Polyisocyanate | 140 pts/wt |

The above polyol mixture comprising Polyols 1–3 has an average OH number of 568 mg KOH/g.

Example 1

Chopped fiberglass strand mats B) with a GSM (gram per square meter) of 450 were placed on both sides of a core (A), comprising a paper honeycomb of the 5/5 corrugated board type with a thickness of 12 mm and a GSM of 960, and altogether 1,150 g of Polyurethane formulation 1 (P) were sprayed onto them at ambient temperature. This sandwich structure was inserted in a mold, in which an aluminium sheet coated with standard priming paint with a thickness of 0.85 mm, a density of 2,640 kg/m$^3$ and an initial flexural strength of $2.18 \times 10^5$ N·mm² was previously placed in the lower part as the outer layer C), and a decorative textile with PUR sheeting forming a barrier to foam penetration was previously placed in the upper part as a decorative layer D) with a GSM of about 180. This bonded fabric was then pressed to a wall thickness of 11.7 mm in the mold and heated to 110° C. After a pressing time of 240 seconds, the mold was opened and the finished laminated part removed. The laminated part had a density of 444 kg/m³ and a flexural strength of $5.20 \times 10^7$ N·mm².

In comparison to the material used as the outer layer C), the laminated part of the present invention exhibited an increase in flexural strength by a factor of over 200 and a reduction in the average density from 2640 kg/m³ to 444 kg/m³.

Example 2

The production method used was similar to that described above in Example 1. In this Example, a paper honeycomb of the 5/5 corrugated board type with a thickness of 5 mm and a GSM (gram per square meter) of 395 was used as core A), and 1,000 g of Polyurethane formulation 1 (P) were applied to the chopped fiberglass strand mats B) placed on both sides of the core A). The thickness of the aluminium sheet used as outer layer C) was 0.35 mm, density was 2,540 kg/m³ and initial flexural strength was $1.52 \times 10^4$ N·mm². A textile with a GSM of 180 and a barrier to prevent foam penetration was used as decorative material D). The laminated part 4.9 mm thick obtained after pressing at 110° C. had a density of 654 kg/m³ and a flexural strength of $8.56 \times 10^6$ N·mm². The initial flexural strength of the outer layer C) was increased by a factor of 560.

Example 3

The production method used was similar to that described in Example 1 above. In this Example, a paper honeycomb of the 5/5 corrugated board type with a thickness of 7 mm and a GSM (gram per square meter) of 560 was used as core A), and 900 g of Polyurethane formulation 1 (P) was applied to the chopped fiberglass strand mats placed on both sides of the core A). A compact, thermoformed multi-layer thermoplastic film of a blend of ASA (acrylic ester modified styrene acrylonitrile terpolymer) and PMMA (polymethyl methacrylate) with a thickness of 1.40 mm and an initial flexural strength of $3.43 \times 10^4$ N·mm² was used as outer layer C). A textile with a GSM of 180 and a barrier to prevent foam penetration was used as decorative material D). The mold temperature during the pressing operation was about 60° C. at the outer layer side and about 90° C. at the decorative side. The laminated part obtained, which was 7.2 mm thick, had a density of 517 kg/m³ and a flexural strength of $5.71 \times 10^6$ N·mm².

As a result of the composite structure with PUR bonding, the flexural strength of outer layer C) was considerably increased, i.e. it was increased by a factor of 166.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A laminated part comprising
   A) a core
   B) fiber layers arranged on both sides of said core and impregnated with polyurethane resin (P),
   C) an outer layer of Class A surface quality on one of said fiber layers, and, optionally,
   D) a decorative layer on said second fiber layer,
   wherein said polyurethane resin (P) comprises:
   (1) at least one polyisocyanate component;
   (2) at least one polyol constituent with an average OH number from 300 to 700, containing at least one short-chain and one long-chain polyol, the initial polyols having a functionality of from 2 to 6;
   (3) water;
   (4) activators;
   (5) stabilizers; and, optionally,
   (6) other auxiliary materials, mold release agents and additives.

2. The laminated part of claim 1, wherein A) said core comprises a material selected from the group consisting of thermoformable PUR foams, paper honeycombs, metal honeycombs and plastic honeycombs.

3. The laminated part of claim 1, wherein B) said fibers are selected from one or more of the groups consisting of fiberglass mats, chopped fiberglass strand mats, random layers of fiberglass, fiberglass fabric, cut glass fibers, ground glass fibers, mineral fibers, natural fiber mats, natural knitted fabrics, cut natural fibers, cut natural fiber mats, non-woven fabrics based on polymer, carbon or aramid fibers, and knitted fabrics based on polymer, carbon or aramid fibers.

4. The laminated part of claim 1, wherein C) said outer layer comprises a material selected from the group consisting of metal foils, metal sheets and compact thermoplastic composites.

5. The laminated part of claim 1, wherein D) said decorative layer comprises a material selected from the group consisting of textile materials with a barrier of thermoplastic polyurethane sheeting, compact sheets, foamed plastic sheets, spray-on polyurethane skins and RIM polyurethane skins.

6. A method of making laminated parts, comprising
   (I) applying a fiber layer B) which is impregnated with the constituents of a polyurethane resin (P) to both sides of a core A),
   (II) positioning an outer layer C), and, optionally, a decorative layer D) on the inside surface(s) of an open mold,
   (III) placing the composite formed in (I) into the open mold containing the outer layer C) and, optionally, the decorative layer D),
   (IV) closing the mold, and
   (V) bonding the outer layer, and the decorative layer if present, to the composite by the complete reaction of the constituents of the polyurethane resin (P) components,
   wherein said polyurethane resin (P) comprises:
   (1) at least one polyisocyanate component;
   (2) at least one polyol constituent with an average OH number from 300 to 700, containing at least one short-chain and one long-chain polyol, the initial polyols having a functionality of from 2 to 6;
   (3) water;
   (4) activators;
   (5) stabilizers; and, optionally,
   (6) other auxiliary materials, mold release agents and additives.

7. The method of claim 6, wherein A) said core comprises a material selected from the group consisting of thermoformable PUR foams, paper honeycombs, metal honeycombs and plastic honeycombs.

8. The method of claim 6, wherein B) said fibers are selected from one or more of the groups consisting of fiberglass mats, chopped fiberglass strand mats, random layers of fiberglass, fiberglass fabric, cut glass fibers, ground glass fibers, mineral fibers, natural fiber mats, natural knitted fabrics, cut natural fibers, cut natural fiber mats, non-woven fabrics based on polymer, carbon or aramid fibers, and knitted fabrics based on polymer, carbon or aramid fibers.

9. The method of claim 6, wherein C) said outer layer comprises a material selected from the group consisting of metal foils, metal sheets and compact thermoplastic composites.

10. The method of claim 6, wherein D) said decorative layer comprises a material selected from the group consisting of textile materials with a barrier of thermoplastic polyurethane sheeting, compact sheets, foamed plastic sheets, spray-on polyurethane skins and RIM polyurethane skins.

11. A method of making laminated parts, comprising (I) applying the constituents of a polyurethane resin (P) additionally comprising fiber components to both sides of a core A)

(II) positioning an outer layer C) and, optionally, a decorative layer D) on the inside surface(s) of an open mold, (III) placing the composite formed in (I) into the open mold containing the outer layer C) and, optionally, the decorative layer D), (IV) closing the mold, and (V) bonding the outer layer, and the decorative layer if present, to the composite by the complete reaction of the constituents of the polyurethane resin (P) components, wherein said polyurethane resin (P) comprises:

(1) at least one polyisocyanate component;

(2) at least one polyol constituent with an average OH number from 300 to 700, containing at least one short-chain and one long-chain polyol, the initial polyols having a functionality of from 2 to 6;

(3) water;

(4) activators;

(5) stabilizers; and, optionally, (6) other auxiliary materials, mold release agents and additives.

12. The method of claim 11, wherein A) said core comprises a material selected from the group consisting of thermoformable PUR foams, paper honeycombs, metal honeycombs and plastic honeycombs.

13. The method of claim 11, wherein B) said fibers are selected from one or more of the groups consisting of fiberglass mats, chopped fiberglass strand mats, random layers of fiberglass, fiberglass fabric, cut glass fibers, ground glass fibers, mineral fibers, natural fiber mats, natural knitted fabrics, cut natural fibers, cut natural fiber mats, non-woven fabrics based on polymer, carbon or aramid fibers, and knitted fabrics based on polymer, carbon or aramid fibers.

14. The method of claim 11, wherein C) said outer layer comprises a material selected from the group consisting of metal foils, metal sheets and compact thermoplastic composites.

15. The method of claim 11, wherein D) said decorative layer comprises a material selected from the group consisting of textile materials with a barrier of thermoplastic polyurethane sheeting, compact sheets, foamed plastic sheets, spray-on polyurethane skins and RIM polyurethane skins.

* * * * *